April 28, 1931.  W. BOPF  1,802,331
EDUCATIONAL DEMONSTRATING DEVICE
Filed Sept. 7, 1926   3 Sheets-Sheet 1
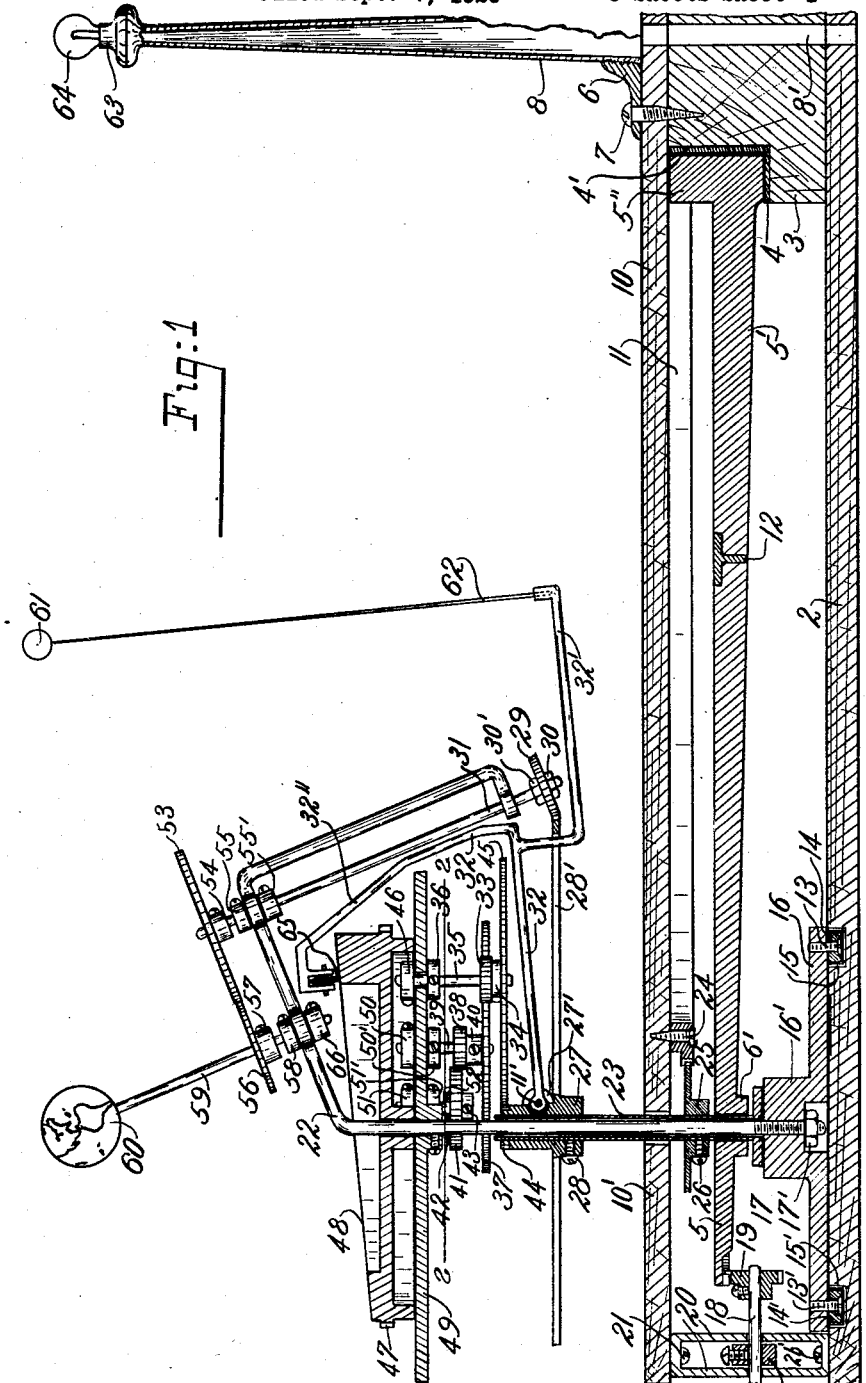
Inventor
Wilhem Bopf

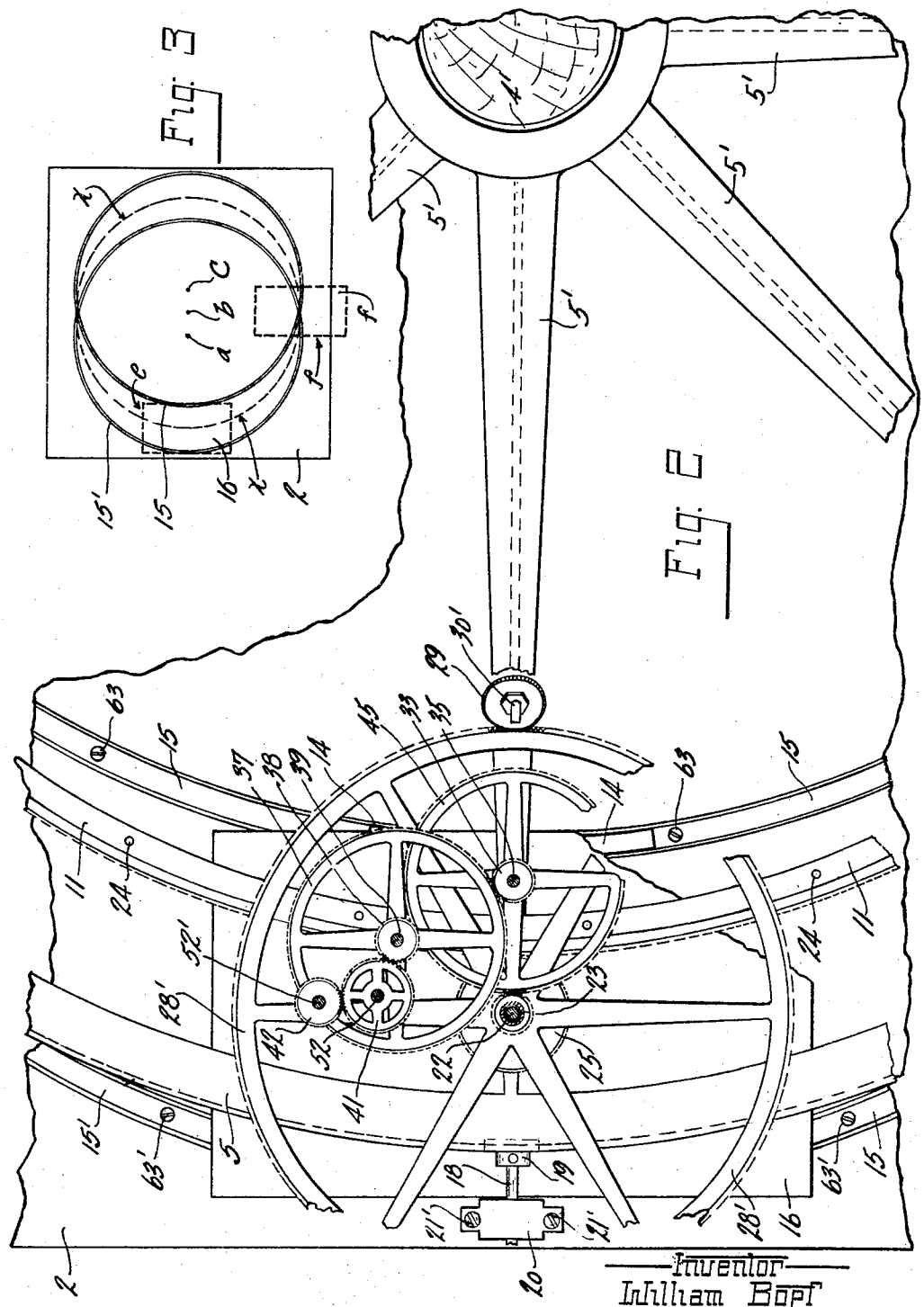

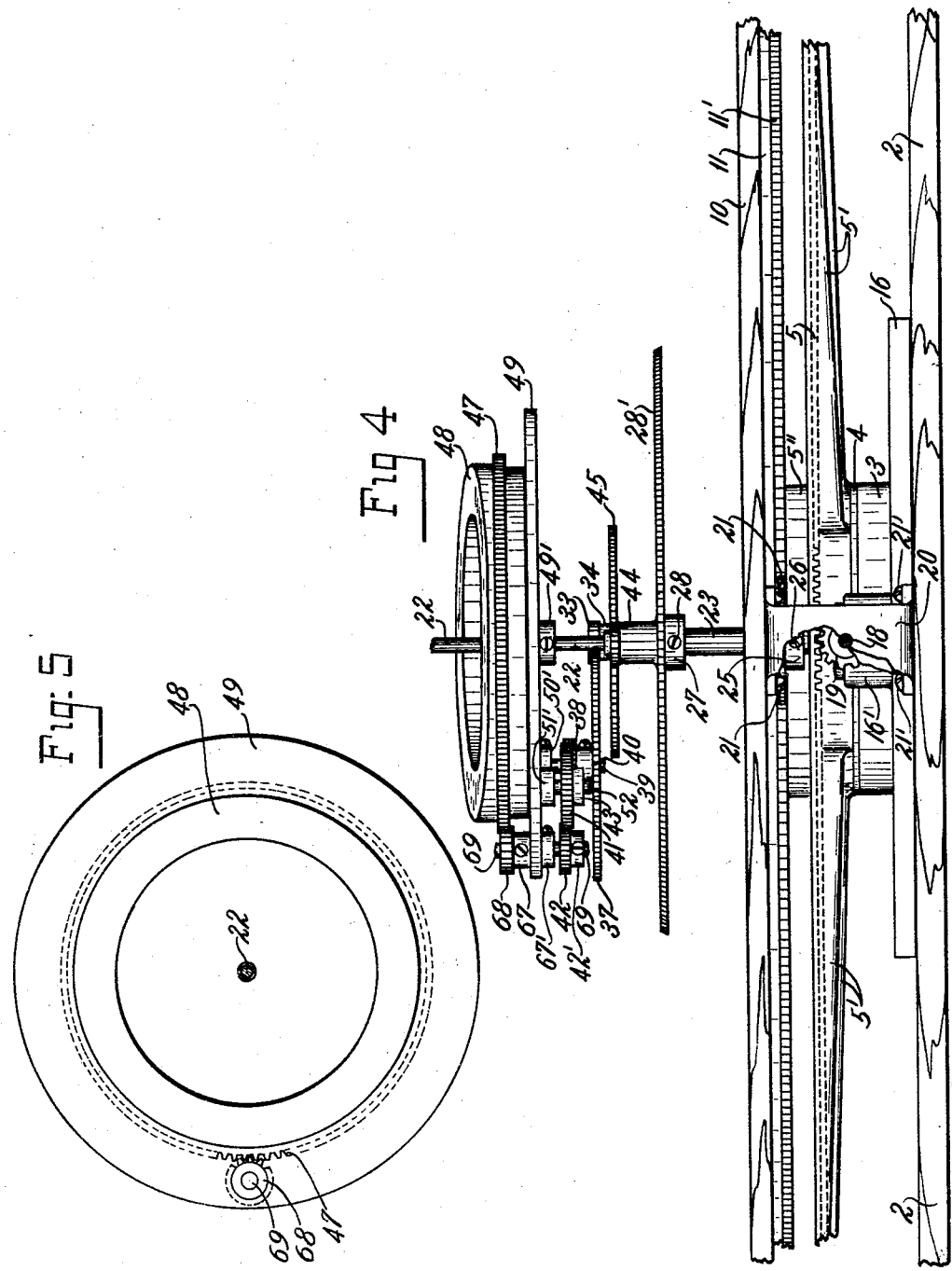

Patented Apr. 28, 1931

1,802,331

UNITED STATES PATENT OFFICE

WILLIAM BAPF, OF WAUSAU, WISCONSIN; AMELIA BOPF EXECUTRIX OF THE ESTATE OF SAID WILLIAM BOPF, DECEASED

EDUCATIONAL DEMONSTRATING DEVICE

Application filed September 7, 1926. Serial No. 133,972.

My invention relates in general to educational demonstrating devices, but is more particularly concerned with astronomical demonstrating devices that show the movements of the earth and the moon with respect to the sun.

I am aware of many and various kinds of educational demonstrating devices of this nature, but to my knowledge none of the existing devices succeed in demonstrating all the major movements of the earth and moon with respect to the sun, that cause the seasons, and the eclipses of the sun and of the moon in a simple and easily apprehendable manner.

The main object of my invention is the production of a simple and inexpensive mechanical device for demonstrating the major movements of the earth and moon with respect to the sun more completely and more clearly than has heretofore been possible with any existing mechanical demonstrating device.

The construction and operation of my new and improved device I shall fully describe with reference to the accompanying drawings comprising Figs. 1–5, inclusive.

Fig. 1 is a front view of part of my device, certain elements thereof being shown in section for better illustration.

Fig. 2 is a plan view of a section on the line 2—2 of same part of the device as shown in Fig. 1, with certain parts removed for better illustration.

Fig. 3 is a diagram illustrating the grooves or guiding tracks in the base of the device.

Fig. 4 is a left end view of the part of the device shown in Fig. 1, omitting certain parts for the sake of clarity.

Fig. 5 is a top view of the part of the device shown in Fig. 4.

It is to be understood, of course, that the relative sizes of the elements representing the earth, moon, and sun, and the relative distances between these elements do not correspond to the relative sizes and distances of the heavenly bodies they represent—these sizes and distances of the representing elements having been chosen with the intention of making the device of a convenient size and yet so as to clearly and impressively illustrate the movements of the heavenly bodies and the phenomena produced by these movements.

The device, in a general way, comprises the following elements: A stationary standard is centrally mounted on a base and supports a small electric light bulb which represents the sun. A rotating carriage carries a small sphere to represent the earth, a smaller sphere to represent the moon, and the gear mechanism for giving the earth and the moon motion with respect to the sun. The rotating carriage is associated with one of the spokes of a large rotary driving wheel which is also mounted on the base with the stationary element representing the sun as its center. By imparting rotative motion to this driving wheel, the carriage carrying the earth and moon is made to rotate about the sun. By means of a gear mechanism carried by the carriage, the earth is made to revolve about its own supporting axis simultaneous with its motion about the sun, making about 364 revolutions about its axis for one revolution about the sun. Its axis is tilted about 23 degrees to the vertical and by a special arrangement is made to point always in one direction (towards the north). By means of another gear mechanism on the carriage and in operative association with the first gear mechanism, the moon is made to rotate about the earth, making about 13 revolutions about the earth for one revolution of the earth about the sun, this rotative motion taking place in a plane which makes an angle of about 10 degrees with the plane of rotation of the earth about the sun, and which shifts in such a way that a line normal to this plane transcribes a cone with the earth as the apex point, the time for one transcription being about 18 times that for one revolution of the earth about the sun.

It is evident from the above description to those having a knowledge of astronomy that the bodies which represent the earth and moon are made to perform all the major component movements with respect to the sun that are actually performed by the heavenly bodies in the universe.

I shall now proceed to describe the mechanical construction of my device in detail: The device, its stationary and rotating parts rests upon the base 2, preferable made of wood, either solid, or built up of veneer sheets, the latter being more desirable in that the probabilities of warping are thereby eliminated. In the center of the base 2 (at the point $b$, Fig. 3) the round wooden axle 3 is securely fastened in any suitable manner, such as with glue, or wood-screws passing through the base 2 and screwing into the axle 3. About two-third of the upper portion of the axle is turned down to a smaller size than its larger diameter. This turned down portion and the horizontal surface adjacent thereto are fitted with the metal sleeve 4' and flat metal ring 4 forming suitable bearing surfaces.

The master driving wheel, comprising the rim 5, spokes 5', and the hub 5'' is rotatably mounted over the metal sleeve 4', resting on the metal ring 4. The master driving wheel is shown as having eight spokes, having T-shaped cross-section as indicated in the conventional manner at 12. One of the spokes has an enlarged portion 6' near the end. Through the center of this enlarged portion 6' a hole is bored perpendicularly, forming a suitable bearing for the hollow shaft 23, to be described later. Teeth are cut on the bottom of the outer edge of the rim 5, these teeth meshing with the teeth of the driving pinion 19.

The driving pinion 19 is securely fastened to the driving shaft 18 by means of the lock screw screwed through the hub of the pinion 19 and pressing against the shaft 18. The shaft 18 is supported in the bearing member 20, held in proper operative relation to the master driving wheel by means of the collar 20'. A hand crank (not shown) may be fastened to the end of the shaft 18 by which rotative motion may be imparted to the shaft, or more preferably, another wheel may be fastened on the outer end, geared or belted to the shaft of a small electric motor. The bearing member 20 for supporting the shaft 18 is fastened to the lower base 2 by means of wood screws 21', and to the upper base 10' (to be described later) by means of wood screws 21.

As mentioned above, the hollow shaft 23 passes through the hole bored through the enlarged portion 6' of one spoke 5'. The shaft 22 passes through the hollow of this shaft, and threads into the supporting base 16' of the guide plate 16 and is securely fastened in position by means of the lock nut 17', shown clearly in Fig. 1. The guide plate 16' being preferably made of metal, is rectangular in shape to facilitate its manufacture.

The metal guides 14 and 14' are rotatably fastened to the underside of the guide plate by means of the flat head screws 13 and 13' equal distances to either side of the center of the guide plate (the center point of the shaft 22) and in a straight line therewith. A cross section of these metal guides is shown in Fig. 1, and the plan view of guide 14 is partially shown in Fig. 2. These guides are curved so that they may slide freely in the circular tracks 15 and 15' cut into the base 2. These tracks are lined with metal U-shaped lining held in place by means of the screws 63 and 63'.

The respective positions of these tracks is diagrammatically shown in Fig. 3, to which reference is now made. In Fig. 3, the point "$b$" is the center of the base 2, or the center of the axle 3 upon which the master driving wheel is rotatively positioned, and is the center of the dotted circle "$x$" representing the circle transcribed by the center of the guide plate 16. The point "$a$" is the center of the circle representing the track 15' for the guide 14', and the point "$c$" is the center of the circle representing the track 15 for the guide 14. The points "$a$", "$b$" and "$c$" are on a straight line, and spaced equal distances apart.

Considering the apparatus as far as has been described, it is evident that if the master driving wheel be rotated, motion being imparted thereto by turning the crank or driving the motor fastened or geared to the shaft 18, the guide plate 16 is rotated about the center of the axle 3, but by reason of the guides 14' and 14 which follow in their respective tracks, the guide plate 16 itself is maintained pointing in one direction, i. e., any imaginary line drawn on the guide plate always remains parallel to its original position. In Fig. 3 the guide plate 16 is shown (dotted) in two different positions "$e$" and "$f$". It is evident that as the guide plate 16 makes one complete revolution about the center of the axle 3, the guide 14 makes one complete revolution about its supporting screw 13, and the guide 14' makes one complete revolution about its supporting screw 13'. It is further evident therefore that the guides 14 and 14' while they should be sufficiently long so that there is no danger of their not following in their respective tracks at the points where the tracks cross each other, neither must interfere with the rotation of the other about its center point. The reason for imparting such portion to the guide plate and the shaft 22 supported thereby will become obvious from later descriptions.

Returning now to the description of the construction of the device, a top board comprising the inner section 10 and the outer section 10', is mounted over the base 2, covering the apparatus thus far described. The top board is shown in Figs. 1 and 4, but is removed in Fig. 2 for the sake of better illustration of the operating mechanism. The inner section 10 is circular in shape of a diameter slightly smaller than the diameter of the circle transcribed by the shaft 23 in its rotation about the center point "$b$" of the axle 3 to give the shaft 23 comfortable clearance. This inner section is mounted on, and secured to, the axle 3 by means of three or more screws (only one of which is shown) which pass through the rim of the central circular supporting fixture 6, through the top board section 10, and into the axle 3.

The outer section 10' has an inside hole of a diameter slightly larger than the diameter of the circle transcribed by the shaft 23 in its rotation about the center point "b" of the axle 3, again to give comfortable clearance. This outer section is supported on the supports such as 20, three or more of which may be provided, equidistantly spaced around the sides of the base 2, the particular support 20 shown acting also as a bearing support for the shaft 18 as described previously.

The upright element 8 is a hollow ornamental support adapted to hold the small electric light socket 63. On its bottom end, it threads into the fixture 6. The small electric bulb 64 screws into the socket 63 and represents the sun. Connecting wires (not shown) for supplying current to the bulb 64 pass through the hollow support 8, and through the hole 8' in the top board 10', axle 3, and base 2.

The inner section 10 affords a means for supporting the gear rim 11, the rim 11 being secured to the underside of the top board section 10 by means of screws such as screw 24 evenly spaced at frequent intervals. To the hollow shaft 23, which encloses the lower part of the inner shaft 22, the pinion 25 is secured, held in position by means of the screw 26. The teeth of the pinion engage those of the gear rim 11. Thus when rotative motion is imparted to the master drive wheel, the inner shaft 22 is caused to rotate about the center point "b", rotation about its own axis being prevented by means of the guide plate 16 and guides 14 and 14'. The outer shaft obviously rotates about the center point "b" but also undergoes an axial rotation by reason of the pinion 25 engaging the teeth of the rim 11. The purpose for giving the outer shaft 25 this motion will become obvious from later descriptions.

The hollow shaft 25 has an enlarged flat portion on its bottom end, which rests and rotates on top of the boss 16'. The top of the boss 16' is smoothed off to form a good bearing surface. On the upper end of the shaft 23 the gear wheel 28' is mounted and fastened by means of the screw 28 threaded into the hub 27. Gear teeth are also cut into the upper end of the hub 27 which mesh with the teeth of the gear 45 of the gear train to be described presently. The arm 32 of the goose-neck member is pivoted to the hub 27 by means of the small pin 11' passing through two projections 27' (only one being shown) and the end of the member 32—the end of the member 32 being between the projections 27'. In operation, the goose-neck support rotates with the gear wheel 28' and also moves through a small angle about the pin 11' (to be described further presently).

Some distance above the end of the shaft 23, the circular supporting plate 49 is securely fastened to the shaft 22 by means of the set screw threaded through the hub 49'. From this supporting plate 49 the shafts 69, 52, 39, and 35 are suspended, being held in their proper positions by means of the hub 67 and collar 67', collars 51 and 51', 50 and 50', and 46 and 36, respectively, the collars being fastened to the shafts by means of suitable set screws. To the bottom end of the shaft 35, the gear combination comprising gear 45, pinion 33, and hub 34, is secured by means of a set screw threaded through the hub 34. To the bottom end of the shaft 39, the gear combination comprising gear 37, pinion 38, and hub 40, is secured by means of a set screw threaded through the hub 40. To the bottom end of the shaft 52, the gear 41 is secured by means of the set screw threaded through its hub 43. To the lower end of the shaft 69 the pinion 42 is fastened by means of the set screw threaded through its hub 42'. The pinion 68 is integral with the hub 67 fastened to the upper end of shaft 69. The positions of the shafts are such that gear 45 meshes with pinion 44; gear 37 meshes with pinion 33; gear 41 meshes with pinion 38; and pinion 42 meshes with gear 41. The pinion 68 fastened to the upper end of the shaft 69 engages the teeth of the orbit control wheel 47.

The orbit control wheel 47 rests on its side on the supporting plate 49 and rotates about the center shaft 22. The bottom side of the hub and the rim of this wheel 47 are made long enough to give ample clearance space for the ends of the shafts 52, 39, and 35 and for the collars 51, 50, and 46 holding these shafts, respectively. The upper side of the rim is cut on a slant and forms the track upon which the small wheel 65 rolls. The plane of this track makes an angle of about 10 degrees with a horizontal plane. The wheel 65 is held in position in the fork of the arm 32'' of the goose-neck member by means of the small pin.

The small sphere 61, which represents the moon is suitably fastened on the upper end of the rod 62 which is held rigid in the arm 32' of the goose-neck member.

A short distance above the hub of the wheel 47, the shaft 22 bends downward making an angle of about 23 degrees with the horizontal. Some distance above this bend, the shaft 22 has an enlarged portion through which a hole is bored. Through this hole the shaft 59 passes, being held in position by means of the collars 58 and 66, each securely fastened to the shaft 59 by means of set screws. Just above the upper collar 58, the gear wheel 56 is rigidly fastened on the shaft 59 by means of the screw 57 screwed into its hub. A sphere 60, with the continents and oceans indicated, having a diameter about four times that of sphere 61 is suitably fastened on the upper end of the shaft 59 and represents the world.

Beyond the enlarged portion through which the shaft 59 passes, another hole is bored through another enlarged portion in the shaft 22. Through this hole, the shaft 31 passes, being held in position by means of the collars 55 and 55', each securely fastened to the shaft by means of set screws. The gear wheel 53 is rigidly fastened on the upper end of the shaft 31 by means of the set screw threaded through the hub 54. The relative positions of the shafts 59 and 31 is such that the gear wheels 56 and 53 mesh. On the lower end of the shaft 31 the pinion 29 is rigidly fastened by means of the lock nuts 30' and 30, the pinion 29 meshing with the gear 28'. Just beyond the upper enlargement of the shaft 22, the shaft makes a right angle bend extending downward and near its lower end the shaft 22 makes another right angle bend. This last part is also enlarged with a hole through it through which shaft 31 passes, aiding in holding the shaft in its proper position to keep the pinion 29 in mesh with the gear 28'.

To operate the device, the crank (not shown) at the end of the shaft 18 is turned by hand, or the electric motor geared to the shaft is operated. The master driving wheel rotates and drives the carriage about its center of rotation in a counter clockwise direction. Thus the body 60 representing the earth and sphere 61 representing the moon is rotated about the central stationary light 64 representing the sun. Simultaneously with its rotation about the sun the earth also rotates, also in a counter clockwise direction on its axis by reason of the gear train 56 and 53, and 29 and 28', the gear 28' being fastened to the hollow shaft 23 which is given axial rotation by virtue of the pinion fastened to it engaging the toothed rim 11. Furthermore the body 61 representing the moon at the same time rotates in a counter clock-wise direction about the body 60 representing the earth by reason of its being supported on the goose-neck member which is hinged to the hub of gear 28' by means of pin 11'. The orbit of the moon about the earth is inclined with respect to the orbit of the earth about the sun and is governed by the orbit control wheel 47, the roller 65 rolling on the inclined track-way 48 of this wheel. Furthermore the position of the orbit of the moon shifts with respect to the orbit of the earth so that a line normal to the plane of the orbit of the moon transcribes a cone, this being controlled by the gear train supported by the plate 49 which slowly rotates the orbit control wheel in a clock-wise direction. The gear ratios between the various gears are such that the earth revolves on its axis 364 times in making one revolution about the sun. The moon rotates 13 times around the earth while the earth makes one revolution about the sun, and one cycle of the shift of the orbit of the moon takes place each eighteen revolutions of the earth about the sun; i. e. the orbit control wheel makes one revolution for every eighteen revolutions of the earth about the sun.

Having described my invention, its construction and operation, what I claim is new and desire to have protected by Letters Patent is set forth in the appended claim:

1. In an astronomical demonstrating device, a body representing the sun, a second body representing the earth, means for rotating said second body about said first body, means controlled by said first means for revolving said second body about a diametrical axis as said second body is rotated about said first body, a base for supporting said first body, a carriage for supporting said second body and means for maintaining said carriage always pointing in the same direction, said last means including two curved endless non-concentric tracks in said base intersecting at two points and guides, one for each track, fastened to said carriage and adapted to slide in the track, each guide being long enough to reach over each intersection of the two tracks.

2. In an astronomical demonstrating device, a first, a second, and a third body representing the sun, earth, and the moon, respectively, means for simultaneously imparting rotary motion to the second body about the first body, revolutionary motion to the second body about a diametrical axis, rotary motion to the third body about the second body in a plane which makes an angle with the plane of rotation of the second body about the first body, means controlled by said first means for changing the position of the plane of rotation of the third body about the second body with respect to the plane of rotation of the second body about the first body, and means for maintaining the axis of said second body always pointing in one direction, said means comprising a base having curved endless nonconcentric tracks therein, and a carriage for supporting said second body having guides fastened thereto adapted to slide in said tracks.

3. An astronomical demonstrating device comprising a base, a support centrally mounted on said base, a second base mounted on said support, a body representing the sun mounted on said second base, a gear secured to said second base, a carriage comprising a table, a supporting shaft, and a bed plate, curved endless non-concentric tracks in said first base, guides rotatably fastened to said bed plate and curved to fit into said tracks, a master drive wheel for revolving said carriage about the sun, a sleeve rotatable on said shaft, a pinion secured to said sleeve and engaging said gear, for causing said sleeve to rotate on said shaft as the carriage is revolving about the sun, a second gear beveled on one face resting on said table and rotatable about said shaft, a third gear and a second pinion secured to said sleeve, a gear train supported from said table, the first gear of said train engaging said pinion and the last gear of said train engaging said beveled gear for causing said beveled gear to rotate about said shaft as the carriage is revolved about the sun, a supporting member pivoted to said sleeve, a second body representing the moon mounted on said supporting member, a roller fastened to said supporting member and adapted to roll on the beveled face of said beveled gear, a second shaft rotatably mounted on said supporting shaft, a third body representing the earth mounted on said second shaft, a fourth gear secured to said second shaft, and a second gear train supported by said supporting shaft, the first gear of said second train engaging said third gear and the last gear of said second train engaging said fourth gear, for causing the earth to revolve on its axis as said carriage is revolved about the sun.

4. An astronomical demonstrating device comprising a base having curved endless non-concentric tracks therein, a carriage comprising a table, a supporting shaft, and a bed plate, guides rotatably fastened to said bed plate and curved to fit into said tracks, a body representing the sun, means for revolving said carriage about said body, a sleeve rotatable on said shaft, means controlled by said first means for rotating said sleeve on said shaft as said carriage is revolved about the sun, a second body representing the earth rotatably mounted on said supporting shaft, and means controlled by said sleeve for rotating said second body on its axis and for rotating said third body about said second body as said second body is revolved about said first body.

5. An astronomical demonstrating device comprising a base having curved endless non-concentric tracks therein, a carriage comprising a supporting shaft and a bed plate, guides rotatably fastened to said bed plate and curved to fit into said tracks, a body representing the sun, means for revolving said carriage about said body, said carriage being maintained pointing in a fixed direction by reason of said guides following in said tracks, a second body rotatably mounted on said supporting shaft, a third body representing the moon, and means controlled by said first means for rotating said third body about said first body in a plane with respect to the earth which makes an acute angle with the plane of revolution of said second body about said first body, and means controlled by said first means for causing the plane of rotation of said third body about said second body to constantly shift with respect to the plane of revolution of said second body about said first.

6. In an astronomical demonstrating device, a first, a second, and a third body representing the sun, the earth, and the moon respectively, a base for supporting the first body, a carriage for supporting the second and the third body, means for simultaneously imparting revolutionary motion to the second body about the first, revolutionary motion to the third body about the second, and rotary motion to the second body about a diametrical axis, and means for maintaining the axis of revolution of said second body always pointing in the same direction, said last means including two curved endless non-concentric tracks intersecting at two points in said base, and guides for said tracks fastened to said carriage and adapted to slide in said tracks, each guide being long enough to reach over each intersection of the two tracks.

7. In an astronomical demonstrating device, a first, a second, and a third body representing, the sun, the earth, and the moon, respectively, a support upon which said second body is rotatably mounted, a sleeve member embracing said support, means for rotating said sleeve about said support, gear means carried by said support for transmitting rotary motion from said sleeve to said second body, an arm for supporting said third body pivoted to said sleeve member, a gear having a beveled face rotatably carried on said support for determining the plane of rotation of said arm, gear means for transmitting rotary motion from said sleeve to said beveled face gear, and means for revolving said support about said first body.

8. In an astronomical demonstrating device, a first, a second, and a third body representing, the sun, the earth, and the moon, respectively, a support upon which said second body is rotatably mounted, a sleeve member embracing said support, means for rotating said sleeve about said support, gear means carried by said support for transmitting rotary motion from said sleeve to said second body, an arm for supporting said third body pivoted to said sleeve member, a gear having a beveled face rotatably carried on said support for determining the plane of rotation of said arm, gear means for transmitting rotary motion from said sleeve to said beveled face gear, means for revolving said support about said first body, and means for preventing said support from executing any rotary movement while being revolved about said first body.

9. In an astronomical demonstrating device, a first, a second, and a third body, representing, the sun, the earth, and the moon, respectively, a support upon which said second body is rotatably mounted, a gear embracing said support, rotating means for rotating said gear about said support, means for transmitting rotary motion from said gear to said second body, an arm pivoted to said gear for supporting said third body, a beveled face member rotatably carried on said support for controlling the plane of rotation of said arm, means for transmitting rotary motion from said gear to said beveled face member, and means for revolving said support about said first body, said rotating means being actuated by the revolution of said support about said first body.

10. In an astronomical demonstrating device, a first, a second, and a third body, representing, the sun, the earth, and the moon, respectively, a support upon which said second body is rotatably mounted, a gear embracing said support, rotating means for rotating said gear about said support, means for transmitting rotary motion from said gear to said second body, an arm pivoted to said gear for supporting said third body, a beveled face member rotatably carried on said support for determining the plane of rotation of said arm, means for transmitting rotary motion from said gear to said beveled face member, means for revolving said support about said first body, said rotating means being actuated by the revolution of said support about said first body, and means for preventing said support from executing any rotary movement while being revolved about said first body.

11. In an astronomical demonstrating device, a first, a second, and a third body representing the sun, the earth, and the moon, respectively, a support upon which said second body is rotatably mounted, a gear embracing said support, means for rotating said gear, a beveled face gear rotatably carried by said support above said first gear, means for transmitting relatively slow rotary motion from said first gear to said beveled face gear, an arm pivoted to the hub of said first gear and having guiding engagement with the beveled face of said beveled face gear, means for transmitting relatively fast rotary motion from said first gear to said second body, said arm having an extension extending below the plane of said gear and then upwards to approximately the horizontal plane containing said second body where said third body is supported thereon, and means for rotating said support about said first body.

12. In an astronomical demonstrating device, a first and a second body representing the earth and the moon, respectively, a movable support upon which said first body is rotatably mounted, a gear wheel embracing said support and rotatable about the axis thereof, means for transmitting rotary motion from said gear to said first body, an arm pivoted to said gear for supporting said second body, a beveled face member rotatably carried on said support for determining the plane of rotation of said arm, said arm having guiding engagement with the beveled face thereof, means for transmitting rotary motion from said gear to said beveled face member, and means actuated by moving said support for causing said gear to rotate about its axis.

13. An astronomical demonstrating device comprising a base having curved endless non-concentric tracks therein, a carriage comprising a table, a supporting shaft, and a bed plate, guides on said bed plate adapted to follow in said tracks, at least one of said guides being rotatably supported and having substantially the curvature of the track in which it follows, a body representing the sun, means for revolving said carriage about said body, a sleeve rotatable on said shaft, means controlled by said first means for rotating said sleeve on said shaft as said carriage is revolved about the sun, a second body representing the earth rotatably mounted on said supporting shaft, and means controlled by said sleeve for rotating said second body on its axis and for rotating said third body about said second body as said second body is revolved about said first body.

14. In an astronomical demonstrating device, a first, a second, and a third body representing the sun, the earth, and the moon respectively, a base for supporting the first body, a carriage for supporting the second and the third body, means for simultaneously imparting revolutionary motion to the second body about the first, revolutionary motion to the third body about the second, and rotary motion to the second body about a diametrical axis, and means for maintaining the axis of revolution of said second body always pointing in the same direction, said last means including at least two curved endless non-concentric tracks intersecting at two points in said base, and guides for said tracks mounted on said carriage and adapted to slide in said tracks, at least one of said guides being long enough to reach over each intersection of two tracks.

15. In an astronomical demonstrating device, a first body representing the sun, a carriage supporting at least one body representing the earth, means for moving said carriage about said first body, and means for maintaining said carriage in a position of parallelism with respect to an initial position as it is moved about said first body, said last means including at least two curved endless non-concentric tracks intersecting at two points, and guides mounted on said carriage and adapted to slide in said track, at least one of said guides being rotatably mounted and long enough to reach over an intersection.

In witness whereof I hereunto subscribe my name this 4th day of September, A. D. 1926.

WILLIAM $\overset{\text{his}}{\times}$ BOPF.
mark